Nov. 6, 1962  H. H. JONES ET AL  3,062,326
BREAK-AWAY SWITCH FOR TRAILERS
Filed July 1, 1960
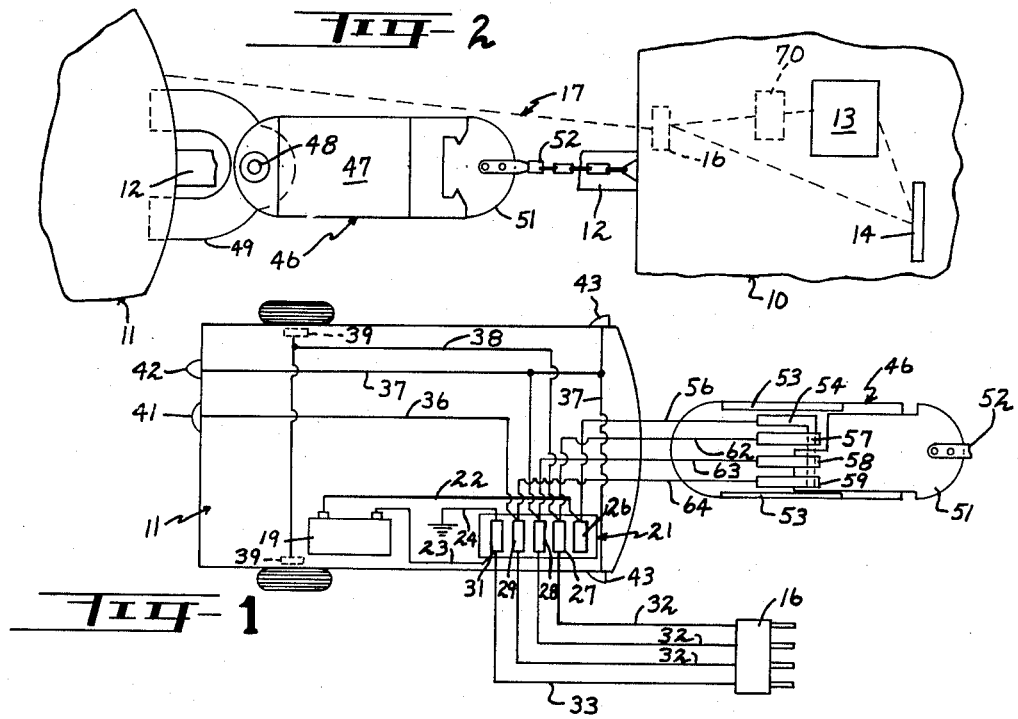
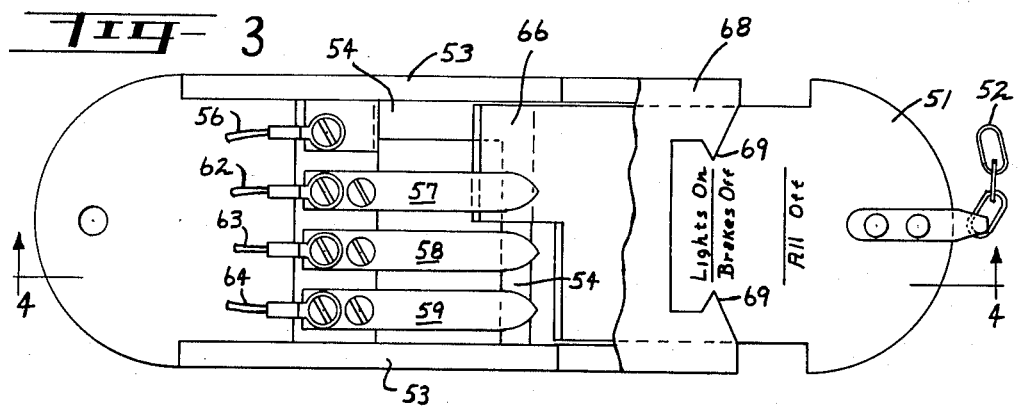
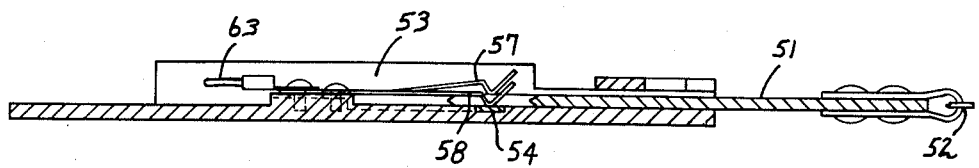
INVENTORS
Hugh H. Jones
Samuel C. Stamps
BY
Jennings Carlile & Thompson
Attorneys

3,062,326
BREAK-AWAY SWITCH FOR TRAILERS
Hugh H. Jones, 6014 1st Ave. N., Birmingham 12, Ala., and Samuel C. Stamps, deceased, late of Birmingham, Ala., by Mabel Wallace Stamps, executrix, 7400 2nd Ave. N., Birmingham 6, Ala.
Filed July 1, 1960, Ser. No. 40,259
2 Claims. (Cl. 188—3)

This invention relates to a break-away switch for trailers and more particularly to a switch for actuating the brakes on a trailer when the trailer is disconnected from a towing vehicle.

Heretofore, rather complicated electrical controls have been provided to actuate automatically the brakes on a trailer when the trailer becomes disconnected from a towing vehicle.

The present invention comprises a two-part switch in series with a circuit from a trailer power source to the trailer brakes with one part of the switch being removable from the other part and operatively connected to the towing vehicle for the trailer whereby upon separation of the towing vehicle from the trailer the switch parts are separated so that the brake circuit is closed to actuate the brakes.

It is an object of the present invention to provide a two-part switch in series with a circuit between a trailer power source and brakes on the trailer with one part of the switch being removable from the other part to close the circuit to the trailer brakes when removed and to open the circuit to the trailer brakes when inserted within the other part.

Another object of the invention is to provide a two-part switch in series with a circuit between a trailer power source and brakes on the trailer with one part being secured to the trailer and the other part being an insulating shoe which separates contacts on the first part and means connecting the insulating shoe to the towing vehicle whereby upon separation of the towing vehicle and the trailer the insulating shoe is removed and the contacts meet to close the circuit to the brakes.

A further object of the invention is to provide a removable insulating shoe for a switch in circuit with a trailer power source and brakes and lights on the trailer with the shoe having three positions within the switch, one position being between contacts on the switch to open the circuits to the brakes and lights, another position being to open the circuit only to the brakes, and another position being to open the circuit to the lights.

Apparatus embodying features of my invention is illustrated in the accompanying drawing, forming a part of this application, in which:

FIG. 1 is a diagrammatic view of a trailer with my control system thereon and showing the break-away switch removed from the trailer with its top cover removed and the insulating shoe inserted therein;

FIG. 2 is a partial, diagrammatic view of my break-away switch connected between a towing vehicle and a trailer which are shown only partially;

FIG. 3 is a top plan view of my break-away switch in enlarged view with the insulating shoe in position within the switch to open the circuit to the brakes and allowing the circuits to the lights on the trailer from the power source on the trailer to remain closed; and, FIG. 4 is a sectional view of the break-away switch taken generally along the line 4—4 of FIG. 3.

Referring now to the drawing for a better understanding of our invention, a towing vehicle is shown partially and is indicated by the numeral 10. It is connected to a trailer 11 by a suitable hitch 12 which is shown broken for the purpose of illustration. A source of electrical power such as a generator indicated by the numeral 13 is provided on the towing vehicle and suitable controls 14 are provided to control the operative elements on trailer 11. A plug 16 which is connected to towing vehicle 10 has a power line 17 running to trailer 11 for supplying power thereto in the normal running operation of towing vehicel 10 and trailer 11.

A separate source of power is provided on trailer 11 in the event the power source is cut off from vehicle 10. For this purpose, battery 19 supplies power to a connector block 21 through lines 22 and 23. Line 23 is connected to ground 24. Connector block 21 has contacts 26, 27, 28, 29 and 31 thereon. Plug 16 is connected to contacts 27, 28, and 29 through suitable lines 32. Line 33 connects plug 16 with ground 24. Contact 29 is connected by line 36 to the stop light 41 of the trailer. Contact 28 is connected by line 37 to the rear light 42 and side lights 43 of trailer 11. Contact 27 is connected by line 38 to solenoids 39 which actuate the brakes on trailer 11. Lines 36, 37 and 38 each contain a positive and a negative line to supply power to the elements to which they are connected. The operator of the towing vehicle 10 controls stop light 41, rear light 42 and side lights 43 through control panel 14 in the normal running operation thereof.

A break-away switch indicated generally by the numeral 46 is composed of two portions, a base portion 47 being pivotally connected at 48 to a semicircular ring 49 that is secured to trailer 11 by suitable means (not shown). The other portion is a generally flat removable insulating shoe 51 and is connected by a chain 52 to towing vehicle 10. Thus, when towing vehicle 10 is separated from trailer 11, shoe 51 is removed from the base portion 47 of switch 46 and is carried by the trailer.

Base portion 47 comprises side guides 53 between which shoe 51 fits. A contact bar 54 extends between guides 53 and is connected by line 56 to contact 26 on connector block 21. Thus, power from battery 19 through line 22 is transmitted from battery 19 to contact bar 54. Spring arms 57, 58 and 59 are biased to engage contact bar 54 when shoe 51 is not positioned between arms 57, 58, 59 and contact bar 54. Contact 57 is in circuit with the brakes on trailer 11 through lines 62 and 38. Contact bar 58 is in circuit with rear light 42 and side light 43 through lines 63 and 37. Arm 59 is in circuit with stop light 41 through lines 64 and 36. During the normal running operation of trailer 11, power is supplied from source 13 on vehicle 10 through plug 16, and switch 46 is out of circuit with the power source from vehicle 10. However, upon disconnection of plug 16, power source 19 is in series circuit with switch 46. Power line 17 indicated generally in FIG. 2 contains lines 32 and 33 therein.

Removable shoe 51 has an extension 66 on the forward end thereof adjacent one side of the shoe and is reversible so that it may be inserted on either side. Thus, if shoe 51 is inserted on one side, as in FIG. 3, arm 57 is separated from contact bar 54. If turned over and inserted on the other side as in FIG. 2, extension 66 separates spring arms 58 and 59 from contact bar 54 thus opening the circuits to the lights.

A cover 68 is shown partially in FIG. 3 with the remainder of cover 68 being broken away. Pointers 69 on cover 68 may be lined up with indicia on shoe 51 to indicate the circuits which are opened or closed. In FIG. 3, since arm 57 is separated from contact bar 54 by extension 66 the circuit is opened from power source 19 on trailer 11 to the brakes. The circuits to the lights remain closed since contact arms 58 and 59 are in engagement with contact bar 54.

If desired to open all circuits from battery 19, shoe 51 may be pushed fully inwardly toward base 47 so that all arms 57, 58, 59 are separated from contact bar 54 by shoe 51. Shoe 51 may be fully inserted from either side thereof regardless of the particular position of extension 66.

In operation, any desired combination of lights and brakes may be obtained by the insertion of shoe 51 at the desired position. When towing vehicle 10 is separated from trailer 11, shoe 51 is removed and plug 16 is disengaged thereby removing the source of power from the towing vehicle. Thus, arms 57, 58, 59 all contact contact bar 54 and power is supplied through battery 19 on trailer 11 thereby to energize the lights and actuate the brakes stopping trailer 11 as soon as it has been disconnected from towing vehicle 10. While power is normally supplied from the towing vehicle and the lights and brakes are controlled by the driver thereof, when the trailer is disconnected the driver has no control at all over the trailer.

From the foregoing, it will be understood that we have provided a safety device for a trailer being towed by a towing vehicle which is simple in operation and construction. Immediately upon the separation of the towing vehicle from the trailer, the brakes and lights on the trailer are actuated. If desired, the lights on the trailer may be energized before the separation of the trailer from the vehicle. Our break-away switch has been found to operate most effectively under running conditions.

Battery 19 is charged during the normal operation of the towing vehicle from the generator 13, voltage regulater 70 and lines 33, 23.

While we have shown our invention in but one form, it will be obvious to those skilled in the art that it is not so limited, but is susceptible of various other changes and modifications without departing from the spirit thereof, and we desire, therefore, that only such limitations shall be placed thereupon as are specifically set forth in the appended claims.

What we claim is:
1. A break-away switch to set the brakes on a trailer hitched to a towing vehicle when the trailer is disconnected therefrom comprising two portions, one portion being secured to said trailer and having two spring biased switch arms thereon, a contact bar adjacent said switch arms extending in a direction transversely of the switch arms and normally engaging said switch arms, one of said switch arms being in series with a circuit to said brakes, the other of said switch arms being in series with a circuit to lights on said trailer, the other of said portions being a removable insulating shoe inserted partially within said one portion and having a forward extension on one side thereof between one of the switch arms and the contact bar to open the circuit to the brakes while allowing the circuit to the lights to remain open, said removable insulating shoe being inserted fully within said one portion between both of said switch arms and the contact bar to open the circuit to the brakes and the circuit to the lights, and means operatively connecting said insulating shoe to said vehicle whereby upon separation of said vehicle and trailer said insulating shoe is removed from said one portion to close the circuits to the lights and to the brakes.

2. A break-away switch to set the brakes on a trailer hitched to a towing vehicle when the trailer is disconnected therefrom comprising a base portion and a generally flat removable insulating shoe, said base portion being secured to the trailer and having two spring biased switch arms thereon, a contact bar adjacent said switch arms extending in a direction transversely of the switch arms and normally engaging said switch arms, one of said switch arms being in series with a circuit to the brakes and the other of said switch arms being in series with a circuit to lights on the trailer, said insulating shoe having an extension on one end thereof adjacent a side of the shoe and being reversible so that the extension may be inserted within either side of the base portion, one side of the shoe being inserted with the extension separating one switch arm from the contact bar and the other side of the shoe being inserted with the extension separating the other switch arm from the contact bar, and means operatively connecting the insulating shoe to the vehicle whereby upon separation of the vehicle and trailer the insulating shoe is removed and both switch arms contact the contact bar to close the circuits to the lights and the brakes.

References Cited in the file of this patent

UNITED STATES PATENTS

| | | |
|---|---|---|
| 1,861,770 | Whyte | June 7, 1932 |
| 2,169,668 | Thomas | Aug. 15, 1939 |
| 2,349,167 | Gunderson | May 16, 1944 |
| 2,676,225 | Jubell | Apr. 20, 1954 |
| 2,834,434 | Stuart | May 13, 1958 |
| 2,867,294 | Sturdivant et al. | Jan. 6, 1959 |
| 2,928,912 | Molnar | Mar. 15, 1960 |

FOREIGN PATENTS

| | | |
|---|---|---|
| 103,981 | Australia | May 17, 1938 |
| 3,398 of 1891 | Great Britain | Dec. 12, 1891 |